June 7, 1966  A. J. POOLE ETAL  3,254,910
FLEXIBLE EXPANSION PIPE JOINT
Filed May 31, 1963  2 Sheets-Sheet 1
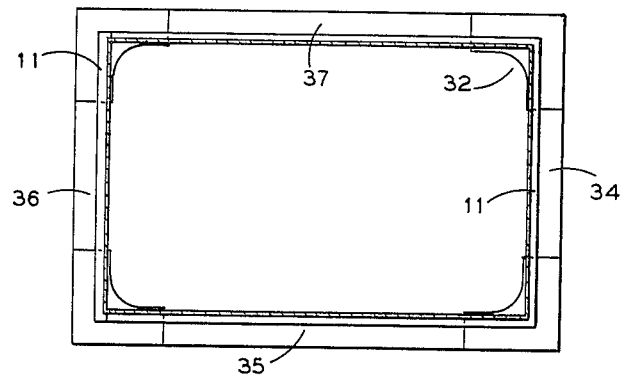
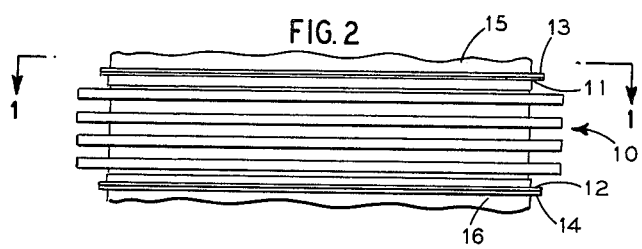
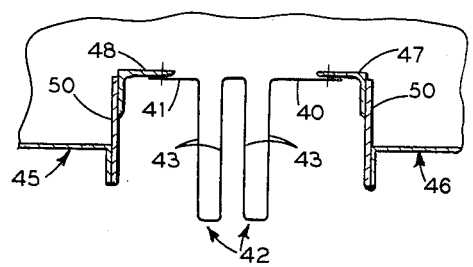
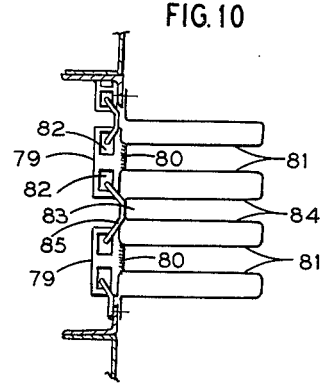
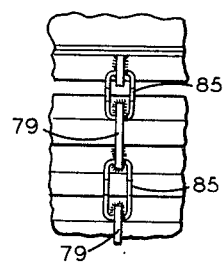
INVENTORS
ARTHUR J. POOLE
JOHN S. BILLY
DANIEL T. COUGHLIN
GORDON A. PATTERSON
BY
ATTORNEY June 7, 1966  A. J. POOLE ETAL  3,254,910
FLEXIBLE EXPANSION PIPE JOINT
Filed May 31, 1963  2 Sheets-Sheet 2

United States Patent Office 3,254,910
Patented June 7, 1966

3,254,910
FLEXIBLE EXPANSION PIPE JOINT
Arthur J. Poole and John S. Billy, Barberton, Daniel T. Coughlin, Wadsworth, and Gordon A. Patterson, North Canton, Ohio, assignors to The Babcock & Wilcox Company, New York, N.Y., a corporation of New Jersey
Filed May 31, 1963, Ser. No. 284,656
2 Claims. (Cl. 285—226)

The present invention relates to the construction and arrangement of expansion joints, and more particularly to flexible expansion joints interposed in conduit or duct systems for confining the flow of large quantities of gaseous fluids which may be dust laden, at relatively high temperatures and at superatmospheric pressures.

In high capacity vapor generating installations large volumes of flue gas and combustion air are withdrawn from and delivered to the installation. The flue gas may contain solids in the form of entrained dust, reach temperatures of 900 F. or higher, and may be at sub or superatmospheric pressures. While the combustion air delivered to the furnace portion of the installation may be generally clean, temperatures may be 500 to 600 F. or higher and the pressure may be as high as two or three pounds per square inch, gage. The ducts or conduits in the gas or air circuit may have a cross-sectional flow area of 50 to 500 square feet and may be of appreciable length with one or more turns therein, to fit the specific arrangement required in a particular installation.

In the present invention the expansion joint or flexible connection is formed by a plurality of plate or leaf portions initially constructed and arranged in generally parallel spaced relationship perpendicular to the substantially common longitudinal axis of the duct sections joined by the flexible joint. Each leaf portion is joined along one periphery by a member arranged parallel to the common axis of the duct sections and is in turn connected with an adjacent leaf portion. The opposite adjacent leaf portion is connected to the first leaf portion by a second member arranged parallel to the axis of the duct sections and positioned along the other periphery of the first leaf. The leaf portions and the connecting members may be constructed from a single plate bent to the desired shape, or may be formed by separate plates joined by welding. The major portion of the flexing in the joint will be attained in the leaf portions of the joint.

The various features of novelty which characterize our invention are pointed out with particularity in the claims annexed to and forming a part of his specification. For a better understanding of the invention, its operating advantages and specific objects attained by its use, reference should be had to the accompanying drawings and descriptive matter in which we have illustrated and described preferred embodiments of the invention.

Of the drawings:

FIG. 1 is a view of an expansion joint constructed in accordance with the invention;

FIG. 2 is a side view of the expansion joint shown in FIG. 1;

FIG. 5 is a modification of the expansion joint of the invention;

FIG. 10 is a side-section of an expansion joint provided with a device for limiting movement of the separate leaves, and;

FIG. 11 is an end section of the joint of FIG. 10.

While the expansion joint of the invention is particularly applicable for use in conduit or duct systems confining the flow of large volumes of gaseous fluids, the invention is not limited to such duct systems. In such large dimensioned duct systems the expansion joint must have sufficient flexibility to compensate for expansion and contraction of the system. In the joint of this invention the leaves may be, for example, 9 inches deep with the spacing between adjacent leaves of 1½ inches. The leaf dimensions are selected to provide the necessary flexibility in the joint and, of course, the longer the leaf the greater the flexibility in each leaf of the joint.

In the embodiment shown in FIGS. 1 and 2, the expansion joint 10 is constructed with four folds, including 8 leaves. The opposite ends, 11 and 12, of the expansion joint 10 connect directly to the matching or facing ends 13 and 14 of the spaced conduit sections 15 and 16, respectively, so that the leaf expansion joint encloses the space between the spaced ends 13 and 14 of the adjacent conduit sections. As hereinafter described the joint 10 may be constructed with one fold, or 10 or even more folds in the same joint. Also as is hereinafter disclosed, the folds of the expansion joint may extend outwardly of the duct; may extend inwardly of the duct; or may extend partially outside and partially inside the duct.

As shown in FIGS. 1 and 2, each leaf of the joint is formed with separate corner sections interconnected by straight sections where the various sections are edge or butt welded to form a continuous substantially flat leaf having an inner and outer periphery. Alternately, when shipping clearance limitations permit, each leaf may be made from a single plate, thereby avoiding butt welding operations in forming each leaf. The opposite ends of the joint are suitably connected to a suitable frame which is attached to a corresponding frame attached to the end of each of the conduit sections, as hereinafter described.

Figure 4:
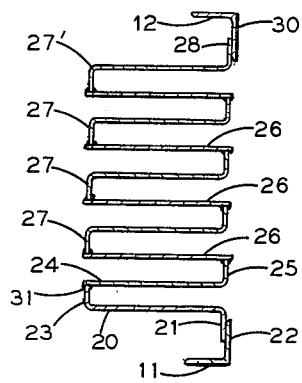
FIG. 4 is a section taken on line 4—4 of FIG. 3.
Figure 3:
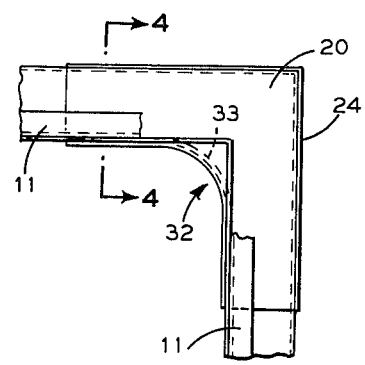
FIG. 3 is an enlarged view of one of the corners of the expansion joint shown in FIG. 1.

The typical construction used for the corner sections of the joint is illustrated in FIG. 3, while in FIG. 4 a five fold cross-section of a corner joint construction is illustrated. As shown, a joint of the type shown in FIGS. 1 and 2 is used to fit a conduit system of square or rectangular cross-section. In this type of joint the exterior edge of a leaf is rectangular, while the inner configuration is curved at the corners to reduce corner stresses during flexing of the joint.

The individual leaf portions of the joint corners may be formed, as shown in FIG. 4, with some of the leaves of the folds provided with peripheral extensions bent in opposite directions, while other leaves are formed flat. As shown the leaf 20 is formed with a lower extension 21 bent outwardly on the inner periphery to be attached to one leg 22 of the angle 11, while the upper extension 23 of the leaf is bent on the outer periphery in the opposite direction to abut the end portion of an adjacent leaf 24. The leaf 24 has an extension 25 on its lower periphery with the end abutting a flat leaf 26. Through the remainder of the joint, the leaves alternate as leaves 27 having upper and lower extensions of opposite hand but otherwise similar to leaf 20, and flat leaves similar to the leaf 26. The leaf 27' at the end of the joint opposite the leaf 20 has its lower extension 28 attached to one leg 30 of the angle 12.

The peripheral extensions of each leaf are welded to the end portion of an adjacent leaf so as to form a fillet of weld metal substantially equal in thickness to the gage of the plate from which the leaves of the joint are constructed. For example, when the leaves are constructed from 1/8" thick plate the extension 23 of the leaf 20 engages the upper end portion of the leaf 24 so that approximately 1/8" of the leaf 24 extends beyond the end of the extension. The weld deposit 31 is positioned in the angle formed between the junction of the two parts.

It will be noted the FIG. 4 section of the corner shown in FIG. 3 is taken in a straight portion of the corner. The inner curved portion 32 of the corner is formed by separate curved plates 33 each of which is welded between the lower peripheral leaf portions so as to close the space between the leaves. The straight sections of the joint, such as indicated at 34, 35, 36, and 37 in FIG. 1, the leaves and their connecting extensions can be constructed from one piece of plate bent to the configuration of the corners illustrated in FIG. 4. If the developed length of the joint becomes unusually long, such as with a 10 fold expansion joint, the straight sections may be formed as two or more portions and joined by continuous welds. The formation of the expansion joint from a continuous plate is illustrated in FIG. 5 by a two fold joint, in FIG. 7 by a three fold joint, and in FIG. 10 by a four fold joint.

In the construction shown in FIG. 5, the folds of the expansion joint are formed as a continuous strip extending between opposite leaf extensions 40 and 41 of the joint. When formed from a single plate, the leaf portions are formed to the same dimensions as the construction shown in FIG. 4 and with the configuration of the loops 42, including the leaves 43. The construction shown in FIG. 5 also illustrates an arrangement where part of the loops project inwardly of the duct walls 45 and 46 and part of the loops project outwardly of the duct walls. The leaf extensions 40 and 41 are connected to the legs of angles 47 and 48, respectively, with the angles secured to spacer plates 50 for attachment of the angle frames of the facing ends of the duct walls 46 and 45 respectively. Such an arrangement reduces the restricting effect on fluid flow through the conduit system, as compared with a joint having its folds extending entirely within the duct, and also restricts the interference with adjacent structural members, as compared with a joint having its folds entirely on the exterior of the conduit system.

Figure 6:
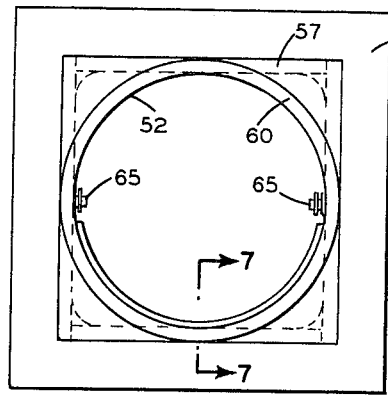
FIG. 6 is a top view of a generally square expansion joint applied in a conduit system of circular cross-section.
Figure 7:
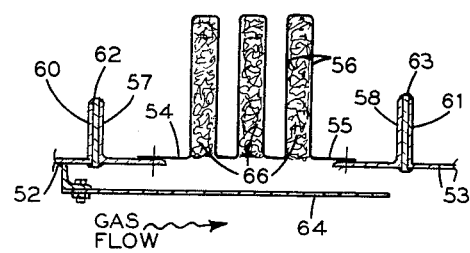
FIG. 7 is a section taken on line 7—7 of FIG. 6.

The flexible joint of the present invention may also be applied to a duct system of circular cross-section. As shown in FIGS. 6 and 7, the joint is of generally square configuration with the length of the sides of the joint substantially equal to the inside diameter of the ducts 52 and 53. The leaves of the joint may be formed of a single plate bent to the proper configuration as shown in FIG. 5 or may be constructed of a series of sections which are butt welded together to form the complete flexible joint as shown in FIG. 4. As in the forms of the invention illustrated in FIGS. 4 and 5, the opposite end extensions 54 and 55 of the leaves 56 are secured to the leg of angles 57 and 58, respectively. The angles 60 and 61 are mounted on the facing ends of the duct sections 52 and 53, respectively, and are attached to the angles 57 and 58 through adapter plates 62 and 63.

When the duct system confines the flow of dust-laden gases, it is sometimes desirable to insert a sleeve 64 on the inside of the duct so as to direct the flow of gases over the expansion joint. This is particularly desirable when an accumulation of dust in the folds might interfere with the flexibility of the joint. Such a sleeve 64 is shown in FIGS. 6 and 7 in the form of a segment of a circle and is installed in the lower portion of the duct. Alternatively, the sleeve may take the form of a complete cylinder to entirely shield the folds of the joint from the accumulation of dust. In either form of construction, one end of the sleeve 64 is attached to the upstream wall 52 of the conduit, while the downstream end of the sleeve extends beyond the joint and is free to expand both laterally and longitudinally relative to the duct 53.

Frequently, an expansion joint may be located in a conduit system to absorb both lateral and longitudinal components of motion. Under such circumstances it is necessary to provide an external guide linkage to direct the desired movement of the joint, to avoid localized overstressing of the joint and the conduit system. Such guide systems are well-known in the art, and will be attached to the pins 65 illustrated in FIG. 6.

It has been found that it is sometimes desirable to insert a resilient layer of fibrous material 66 between the leaves 56 in the internal folds of the joint so as to minimize the accumulation of dust in the folds. With a resilient material, such as KOAWOOL, the expansion joint is still capable of flexing as necessary in operation while the resilient material will minimize the accumulation of dust in the folds of the expansion joint.

Figure 8:
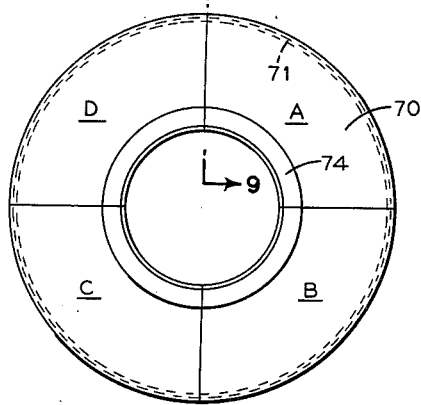
FIG. 8 is a top view of an expansion joint of generally circular cross-section applied in a duct of circular cross-section.
Figure 9:
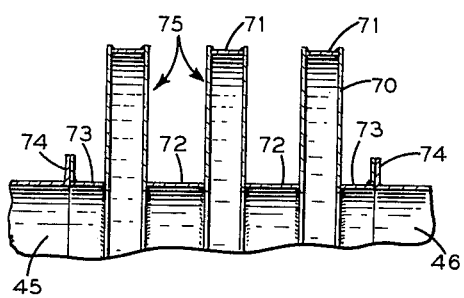
FIG. 9 is a section taken on line 9—9 of FIG. 8.

As shown in FIGS. 8 and 9 the flexible joint of the invention can also be constructed in a circular configuration for application to a circular duct system. In this construction the leaf of the joint may be formed in quarter portions A, B, C and D and butt welded to form annular disc-like leaf members 70. As shown, this construction can be made with alternate pairs of leaves 70 joined to linking members 71 welded to the outer periphery of the leaves, while the inner periphery of adjacent leaf discs 70 are joined by welding connecting members 72 thereto. The outermost members 73 are connected to angle members 74 which are attached to the facing flanges of the duct sections 45 and 46. In this construction the members 71 and 72 are formed as short cylinders and are welded to the leaf discs 70 as described in connection with the structure shown in FIG. 5. This construction provides adequate flexibility in the joint even though the allowable longitudinal movement per leaf of the joint will be less than that of the form of the construction shown in FIG. 4 or in FIG. 5, due to the increased amount of welding used.

It will be noted that in all forms of the leaf type expansion joint the leaves are constructed to lie in parallel planes substantially perpendicular to the axis of the spaced duct sections connected by the joint. This parallel leaf relationship will occur in the initial relaxed, neutral or unstressed position of the joint, and in service under either tension or compression of the joint the leaves will loose their parallel relationship to accommodate the movements in the joint.

In multiple fold joints it may be desirable under extreme loading conditions to provide limiting devices for the flexing of the leaves. Such a limiting device is illustrated in FIG. 10 and 11 where alternate inner connecting members 80 adjacent between alternate pairs of leaves 81 are provided with a plate 79 having a pair of openings 82 therethrough. The other connecting members 83 between the other adjacent leaves 84 are provided with a bar member 85 welded thereto, which extends into the openings in the plate 79 to limit movement in each fold of the joint.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. An expansion joint for connecting spaced conduit sections of rectangular cross-sectional flow configuration and having a substantially common axis, said joint having substantially the same configuration as said conduit sections and comprising a plurality of side and corner portions joined in edge relation to surround the space between said spaced conduit sections, each of said expansion joint portions being formed by spaced leaf members positioned generally perpendicularly to the substantially common axis of said spaced conduit sections, each of said leaf members being connected on its outer periphery to one adjacent leaf member and on its inner periphery to the other adjacent leaf member by plates arranged parallel to said common axis, the corner portions of said expansion joint having their leaf members curved on their inner peripheries, the plates connecting the inner peripheries of alternate corner leaf members being correspondingly curved, the outer peripheries of each corner portion leaf member having a right angled corner, and the plates connecting the outer peripheries of alternate corner portion leaf members being correspondingly right angled to provide an increased depth of said leaf members in said corner portions to thereby increase the flexure strength of the corner leaf members.

2. An expansion joint according to claim 1 wherein the edge joints between each corner portion and the adjoining side portions are butt welded at substantially right angles to each other to eliminate welds in the corner leaf portions.

References Cited by the Examiner

UNITED STATES PATENTS

| | | | |
|---|---|---|---|
| 903,465 | 11/1908 | Fulton | 92—34 X |
| 2,151,911 | 3/1939 | Green | 285—301 |
| 2,404,447 | 7/1946 | Maranick | 285—227 |
| 2,414,987 | 1/1947 | Tobey | 285—301 |
| 2,752,172 | 6/1956 | Ziebold | 285—226 X |
| 2,797,112 | 6/1957 | Ziebold | 285—226 |
| 2,840,394 | 6/1958 | Rohr | 285—226 |
| 2,913,010 | 11/1959 | Whitney | 285—226 X |
| 2,920,565 | 1/1960 | Bertolet | 285—226 X |
| 2,963,043 | 12/1960 | Davis | 92—43 X |
| 3,061,039 | 10/1962 | Peters | 285—229 X |
| 3,070,387 | 12/1962 | Peyton | 285—227 X |
| 3,106,414 | 10/1963 | Peters | 285—226 |

FOREIGN PATENTS

| | | |
|---|---|---|
| 417,118 | 2/1929 | Germany. |
| 812,135 | 8/1951 | Germany. |
| 722,241 | 1/1955 | Great Britain. |
| 306,733 | 7/1955 | Switzerland. |

CARL W. TOMLIN, *Primary Examiner.*

C. B. FAGAN, *Assistant Examiner.*